J. Bowden,
Fastening Boiler Tubes,

No. 60,853.   Patented Jan. 1, 1867.

Witnesses
Jas. A. Service
Wm Dean Overell

Inventor
Jas. Bowden
Per Munn & Co.
Attorneys

United States Patent Office.

JAMES BOWDEN, OF NEW YORK, N. Y., ASSIGNOR TO HIMSELF, WILLIAM H. COLBANKS, AND HORACE THEALL, OF SAME PLACE.

Letters Patent No. 60,853, dated January 1, 1867.

IMPROVED METHOD OF FASTENING BOILER TUBES.

*The Schedule referred to in these Letters Patent and making part of the same.*

TO ALL WHOM IT MAY CONCERN:

Be it known that I, JAMES BOWDEN, of the city, county, and State of New York, have invented a new and useful improvement in Fastening Boiler Tubes; and I do hereby declare that the following is a full, clear, and exact description thereof, which will enable others skilled in the art to make and use the same, reference being had to the accompanying drawing, forming a part of this specification, in which—

Similar letters of reference indicate like parts.

This invention consists in the arrangement of two wedge-shaped split ferrules, one of which slips on the tube to be fastened, and is provided with a screw-thread and nut, while the other fills up the space between the edge of the hole in the tube sheet and the outer surface of the first ferrule in such a manner that by tightening the nut after the tube and ferrules have been adjusted the inner ferrule is drawn up tight against the tube, and the outer ferrule against the edge of the hole, and the tube is firmly secured in its place, and by unscrewing the nut the tube can be readily released and removed from the tube sheet without sustaining any injury. The several joints are made tight by putty or packing.

Figure 2:
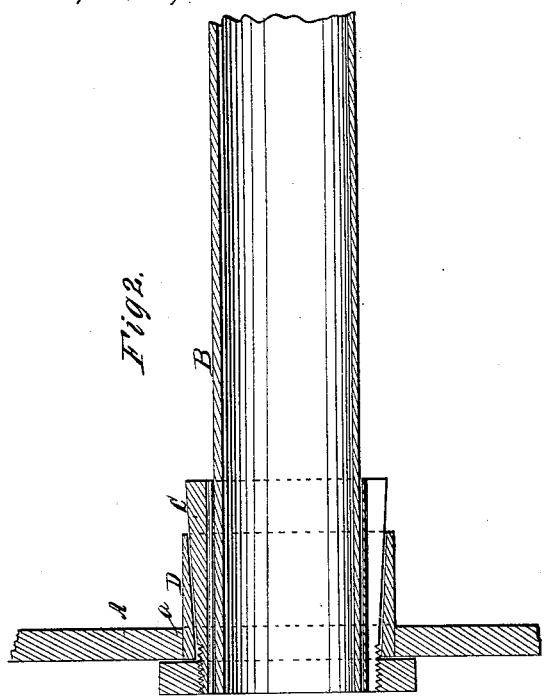
Figure 2 is a longitudinal central section of the same.
Figure 1:
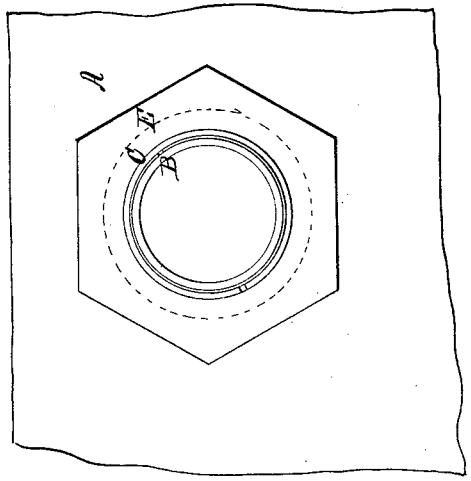
Figure 1 represents an end view of this invention.

A represents the tube sheet of a steam boiler which is provided with a series of holes, $a$, to receive the tubes, B. By referring to fig. 2 of the drawing it will be seen the hole $a$ is considerably larger than the outer diameter of the tube, the intermediate space being filled up by two ferrules, C D. These ferrules are wedge-shaped and split open throughout their whole length, and the inner ferrule, C, is provided with a screw-thread to receive the nut, E. The outer ferrule, D, is of such a size that it fits the hole $a$ in the tube sheet. Between the inner ferrule and the tube a sheet of paper or muslin, or other suitable packing, may be introduced to render the joint tight. After the tube and the ferrules have been adjusted, by turning the nut in the proper direction the ferrule C is wedged in between the tube and the outer ferrule D, and a tight joint is produced between the several parts, the tube being firmly retained in its place. The gaps in the ferrules, if such should exist after the nut is drawn up tight, can be filled up with putty to prevent leakage. The nut may also be provided with a groove on its inner surface to receive putty, if it should be necessary. By releasing the nut the tube can be readily removed without sustaining any injury, and the operation of cutting out the boiler tubes can be dispensed with. By these means a great saving is effected both in inserting and removing the tubes, the operation of inserting being cheap and easily accomplished, and the operation of removing being carried on in such a manner that the tubes can be used over and over again until they become useless by the effects of the fire and of the corrosion.

I claim as new, and desire to secure by Letters Patent—

The wedge-shaped ferrule C D, in combination with the nut E, tube B, and tube sheet A, substantially as set forth.

J. BOWDEN.

Witnesses:
WM. F. MCNAMARA,
ALEX. F. ROBERTS.